(12) United States Patent
Khapochkin

(10) Patent No.: US 10,246,990 B2
(45) Date of Patent: Apr. 2, 2019

(54) PROBE FOR TRENCHLESS GUIDE INSTRUMENT

(71) Applicant: HUANGSHAN GOLDEN LAND ELECTRONICS INC., Huangshan (CN)

(72) Inventor: Yuriy Khapochkin, Huangshan (CN)

(73) Assignee: Huangshan Golden Electronics Inc., Huangshan (CN)

( * ) Notice: Subject to any disclaimer, the term of this patent is extended or adjusted under 35 U.S.C. 154(b) by 151 days.

(21) Appl. No.: 15/509,417

(22) PCT Filed: Apr. 8, 2015

(86) PCT No.: PCT/CN2015/000243
§ 371 (c)(1),
(2) Date: Mar. 7, 2017

(87) PCT Pub. No.: WO2016/078197
PCT Pub. Date: May 26, 2016

(65) Prior Publication Data
US 2017/0292365 A1    Oct. 12, 2017

(30) Foreign Application Priority Data

Nov. 21, 2014   (CN) .......................... 2014 1 0676654

(51) Int. Cl.
*G01D 21/02* (2006.01)
*E21B 47/09* (2012.01)
*E21B 7/04* (2006.01)
*E21B 47/01* (2012.01)
*E21B 47/024* (2006.01)

(52) U.S. Cl.
CPC .......... *E21B 47/0905* (2013.01); *E21B 7/046* (2013.01); *E21B 47/011* (2013.01); *E21B 47/024* (2013.01); *G01D 21/02* (2013.01)

(58) Field of Classification Search
CPC ..... G01D 21/02; E21B 47/0905; E21B 7/046; E21B 47/011; E21B 47/024
USPC ...................................... 73/152.46
See application file for complete search history.

(56) References Cited

U.S. PATENT DOCUMENTS

| | | | | |
|---|---|---|---|---|
| 4,684,946 A | * | 8/1987 | Issenmann | ............ E21B 17/003 175/50 |
| 6,088,580 A | * | 7/2000 | Powlousky | .............. G01V 3/17 324/228 |
| 6,741,153 B1 | * | 5/2004 | Lee et al. | .............. H01F 27/255 336/174 |

(Continued)

*Primary Examiner* — Max H Noori
(74) *Attorney, Agent, or Firm* — Wang Law Firm, Inc.

(57) ABSTRACT

A probe for a trenchless guide instrument includes an antenna, a control circuit board and at least one battery supplies power to the control circuit board; one battery is disposed inside the battery region; the control circuit board is disposed inside the electronic region; a first insulating pipe is disposed inside the antenna and outside the battery, the antenna further includes a magnetic core, and a coil winds around the magnetic cores and one end of the coil is connected to the control circuit board; the magnetic core further includes magnetic core units, each magnetic core unit is made from magnetic material, the magnetic core units are positioned on a peripheral surface of the first insulating pipe, and are insulated from each other.

8 Claims, 10 Drawing Sheets

(56) References Cited

U.S. PATENT DOCUMENTS 9,798,033 B2 * 10/2017 Olsson et al. ........... G01V 3/10
2014/0329478 A1 * 11/2014 Farque et al. .......... F16L 55/48
455/95

* cited by examiner

PROBE FOR TRENCHLESS GUIDE INSTRUMENT

RELATE APPLICATIONS

This application is a national phase entrance of and claims benefit to PCT Application for a probe for a trenchless guide instrument, PCT/CN2015/000243, filed on Apr. 8, 2015, which claims benefit to Chinese Patent Applications 201410676654.6, filed on Nov. 21, 2014. The specifications of both applications are incorporated here by this reference.

TECHNICAL FIELD OF THE INVENTION

The present invention relates to a trenchless guide instrument, in particular to a probe for a trenchless guide instrument.

BACKGROUND OF THE INVENTION

With the large-scale development of urban construction, sewage pipes or energy (liquefied gas, natural gas, etc.) supply pipes have to be laid in cities. A common method is to bury pipelines by trenching, resulting in environmental pollution, traffic jams and potential safety hazards in construction.

Hence, a trenchless technology, which is a construction technology for laying, repairing and replacing underground pipelines by a rock-soil drilling and tunneling method without trenching the road surface or damaging a large area of the surface layer, has also been developed and applied at present. The trenchless technology has the advantages of short cycle, low cost, low pollution, high safety and the like, and will not affect the normal traffic order.

A horizontal directional drilling method, which is implemented by guiding directional drilling of a drill pipe having a drill bit by a trenchless guide instrument, is widely applied to the trenchless pipe-laying technology. The trenchless guide instrument provides real-time operating conditions, such as depth, pitch and clock direction, of the drill bit, so that an operator on the ground controls the drilling path in real time in order to correct subsequent operations in time, thus to ensure precise orientation according to the established path, and to complete trenchless pipe-laying.

The trenchless guide instrument has been widely applied due to a simple and convenient wireless structure. The instrument system includes an underground probe, a ground tracking receiver and a synchronous display. An operator on the ground operates the tracking receiver to determine a perpendicular release point of the drill bit relative to the ground according to a signal which is transmitted by a probe mounted on an underground drill bit, and the operating conditions are acquired according to radio information, which is transmitted by the probe at this release point, received by the tracking receiver.

During the trenchless-guided construction, the probe of the guide system is mounted in a probe compartment of the drill bit. The probe moves in the stratum along with the drill bit, and measures spatial location information of the drill bit in real time and then transmits the signal to a ground receiving device. The operator on the ground can determine deviation between the actual movement path and the designed path of the drill bit according to the spatial location information of the drill bit measured by the underground probe, and then give commands to drill operators who control the movement direction of the drill bit according to the commands, in order to ensure that the drill bit moves forward according to the designed path.

In today's trenchless industry, the probe is a very important part. The antenna in the probe is required to transmit radio signals as many as possible at lowest energy loss. A probe structure usually includes an ECU, an antenna and batteries, with reference to, for example, a guide positioning method and positioning instrument for horizontal directional drilling disclosed in Chinese Patent CN1769645A, where an underground sensing and transmitting probe, which is formed by sealing two metal shells on two ends and an insulating shell in the middle, is provided inside a guided drilling tool connected to the drill pipe; a power supply is mounted in an inner cavity of the metal shell on one end, a wireless transmitting element is mounted in an inner cavity of the insulated shell, and a circuit board on which a signal processing and transmitting element is provided, a tilt angle sensor, a face angle sensor and a temperature sensor are placed in an inner cavity of the metal shell on the other end, and the wireless transmitting element consists of solenoid coils and ferrite magnets sleeved within the coils.

With regard to the probe mentioned above, because magnetic cores of the antenna (the wireless transmitting element) are integrally made from high-permeability ferric oxide and the ferric oxide material itself is relatively fragile, the magnetic cores are easily cracked after a long period of vibration when the drill bit works, thereby generating higher energy consumption, reducing the emission efficiency of the antenna, and reducing the accuracy of the probe position. In addition, because the probe requires more batteries as an energy source and the transmission power of the antenna is direct proportional to its size, it is unable to maximize both the size of the antenna and the capacity of the power supply (the amount of built-in batteries depends upon the length of the battery compartment) in a limited space of the drill bit (the length of the probe is restricted by the drill bit and cannot be infinitely extended), and there is a trade-off between the size of the antenna and the capacity of the power supply.

SUMMARY OF THE INVENTION

A technical problem to be solved by the present invention is to provide a probe for a trenchless guide instrument which can maximize both the size of an antenna and the capacity of a power supply.

A technical solution employed by the present invention to solve the technical problem is as follows: a probe for a trenchless guide instrument is provided, comprising a battery region and an electronic region adjacent to the battery region; an antenna; a control circuit board disposed inside the electronic region; at least one battery disposed inside the battery region; a first insulating pipe disposed inside the antenna and outside the at least one battery; wherein, the at least one battery supplies power to the control circuit board; a first insulating pipe is disposed outside the batteries, and the antenna is disposed outside the first insulating pipe; the antenna further comprises a magnetic core, and a coil winds around the magnetic cores and one end of the coil is connected to the control circuit board; the magnetic core further comprises a plurality of magnetic core units, each magnetic core unit is made from magnetic material, the plurality of magnetic core units are positioned on a peripheral surface of the first insulating pipe, and are insulated from each other.

Preferably, according to one aspect of the present invention, the probe further comprises a metal pipe connected to the first insulating pipe; a second insulating pipe disposed inside the metal pipe, wherein the first insulating pipe is disposed inside the battery region, the metal pipe and the second insulating pipes are disposed inside the electronic region; and the control circuit board is disposed inside the second insulating pipe.

Preferably, in order to arrange the antenna, the at least one battery and the control circuit board hermetically, the metal pipe and the first insulating pipe each has a first end and a second end; the first end of the metal pipe and the first end of the first insulating pipe are connected through a connecting member; a first cover is disposed on the second end of the first insulating pipe, a second cover is disposed on the second end of the metal pipe; an outer pipe is disposed outside the antenna and the metal pipe.

Preferably, according to another aspect of the present invention, the first insulating pipe extends into the electronic region, a metal pipe and a second insulating pipe disposed inside the metal pipe are both disposed inside the electronic region; the metal pipe extends into the battery region and is located between the at least one battery and the first insulating pipe; and the control circuit board is disposed inside the second insulating pipe.

Preferably, in order to arrange the antenna, the at least one battery and the control circuit board hermetically, the second insulating pipe and the at least one battery are connected through a connecting member; the metal pipe has a first end and a second end; a first cover is disposed on the first end of the metal pipe; and a second cover is disposed on the second end of the metal pipe; an outer pipe is disposed outside the antenna.

Preferably, in order to facilitate the arrangement of the magnetic core units, a plurality of insulating spacers, extending along an axis of the first insulating pipe, are distributed around a peripheral surface of the first insulating pipe, a space between every two insulating spacers defines a positioning region; and the plurality of magnetic core units are distributed in the positioning regions forming a ring.

Preferably, each magnetic core unit is formed by a plurality of sheets of magnetic material, each magnetic core unit has an arc-shape cross section.

Preferably, each magnetic core unit is formed by a plurality of strips of magnetic material, each magnetic core unit has an arc-shape cross section.

Preferably, according to a preferred aspect of the present invention, each magnetic core unit is made from nickel steel.

The electronic region comprises a metal pipe connected to the first insulating pipe, and a second insulating pipe provided inside the metal pipe; the control circuit board is fixed inside the second insulating pipe, so that deformation and mechanical fatigue of the control circuit board caused by strong vibration are avoided, thereby enhancing the reliability of the probe.

Compared with the prior art, the present invention has the following advantages:

since the antenna and the at least one battery are respectively provided on an outer side and an inner side of an insulating pipe, both the size of the antenna and the capacity of the batteries can be increased synchronously to the maximum;

since the magnetic cores of the antenna are formed by superposing and binding a plurality of magnetic core units, the eddy current can be effectively reduced, and when the magnetic core units are made from nickel steel, the vibration resistance of a magnetic bar can be enhanced and the service life of the probe can be prolonged; and since the control circuit board is provided inside the metal pipe, deformation and mechanical fatigue of the control circuit board caused by strong vibration are avoided, thereby enhancing the reliability of the probe.

DETAILED DESCRIPTION OF THE INVENTION

Figure 1:
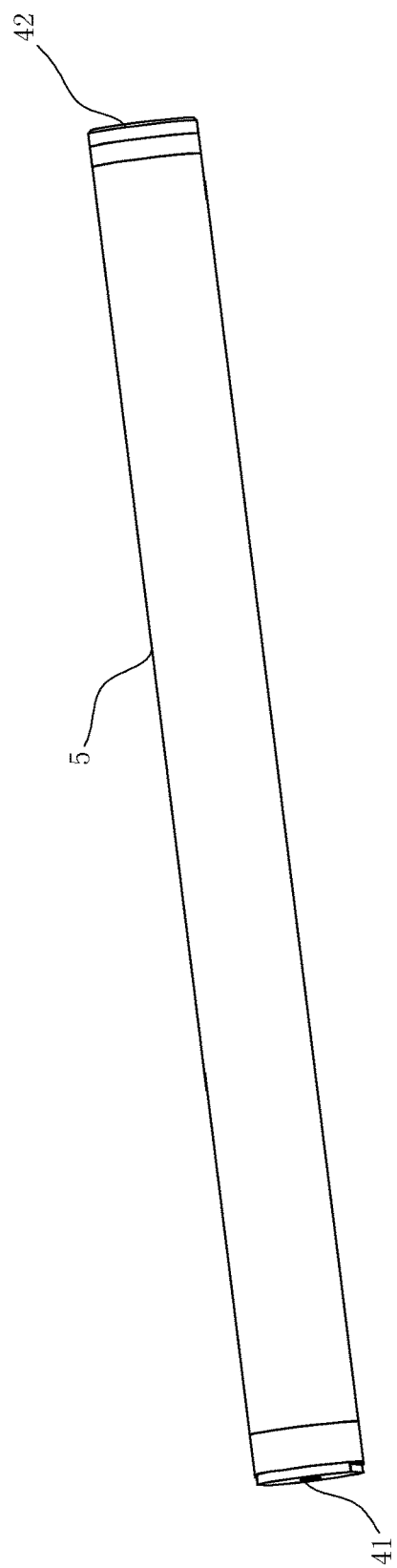
FIG. 1 is a perspective view of a probe for a trenchless guide instrument according to an Embodiment 1 of the present invention.
Figure 2A:
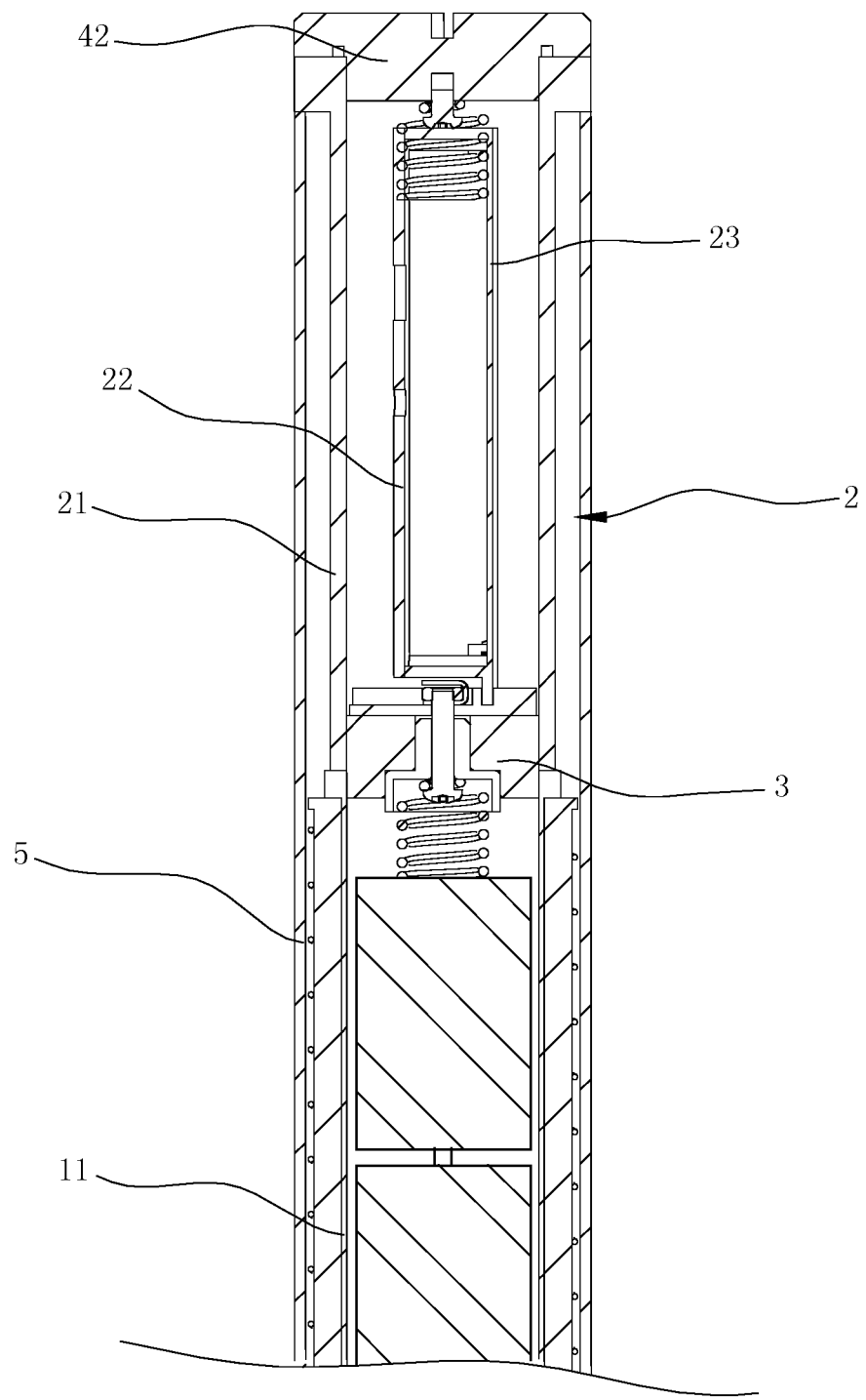
FIGS. 2a and 2b are an axial sectional view of the probe according to the Embodiment 1 of the present invention.
Figure 2B:
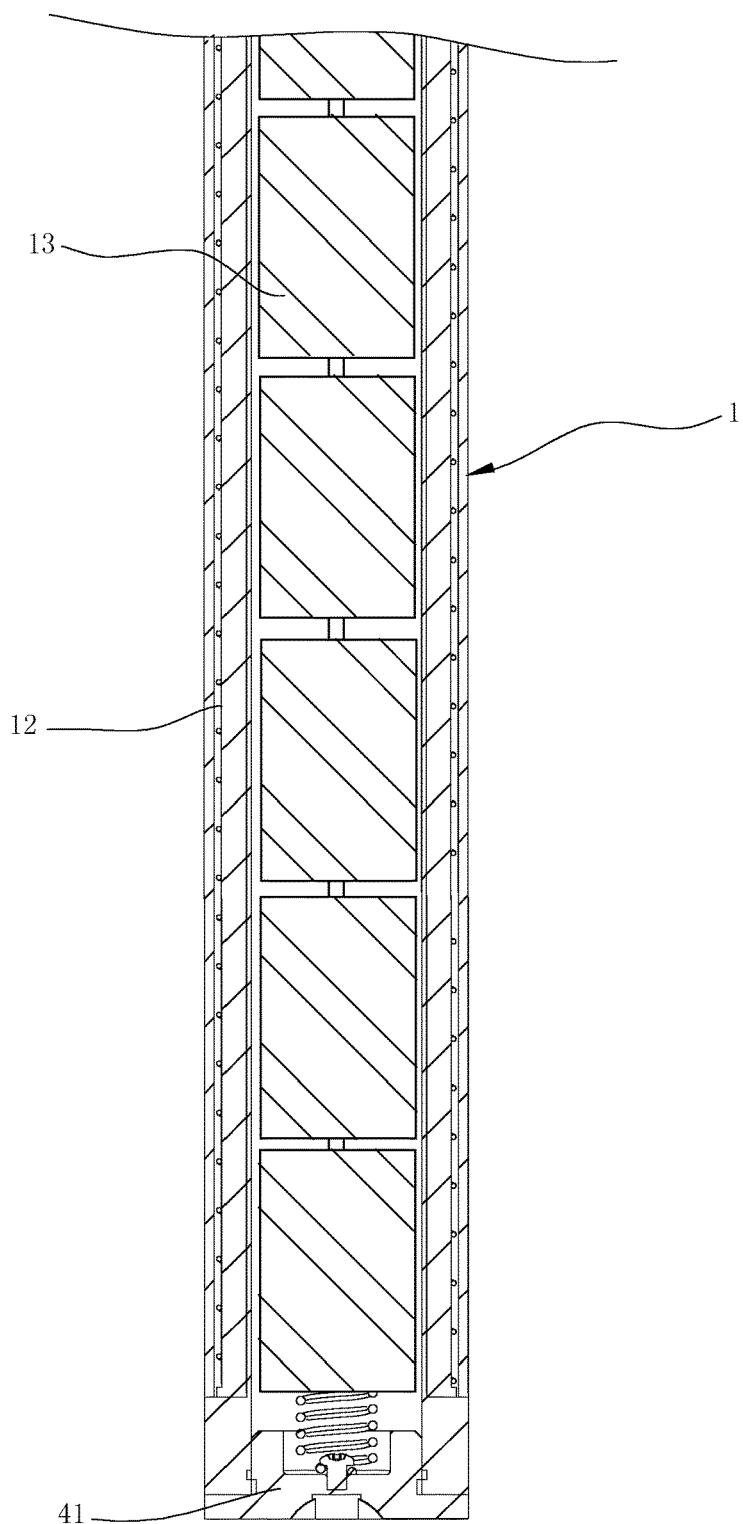
Figure 3A:
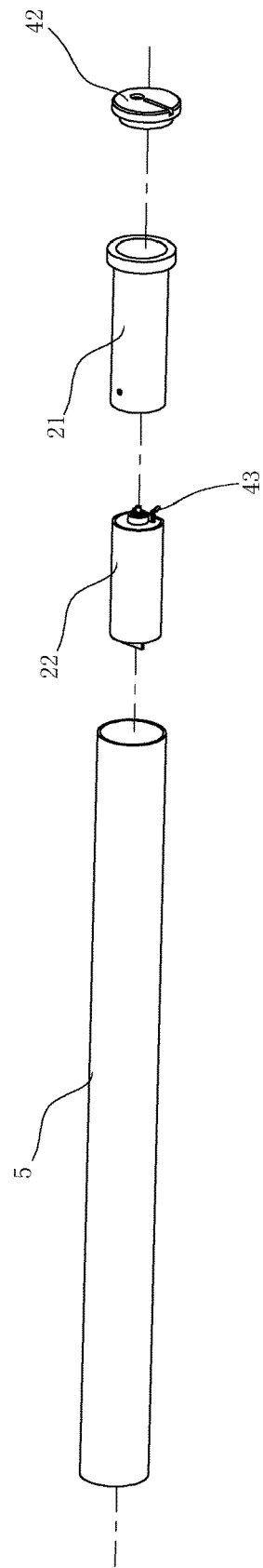
FIGS. 3a, 3b, and 3c are an exploded view of the probe according to the Embodiment 1 of the present invention.
Figure 3B:
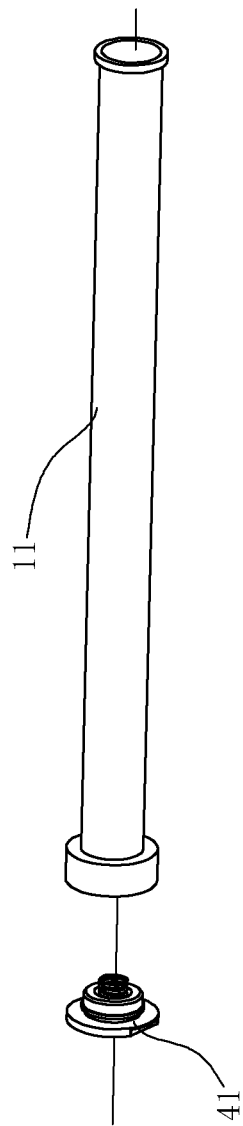
Figure 3C:
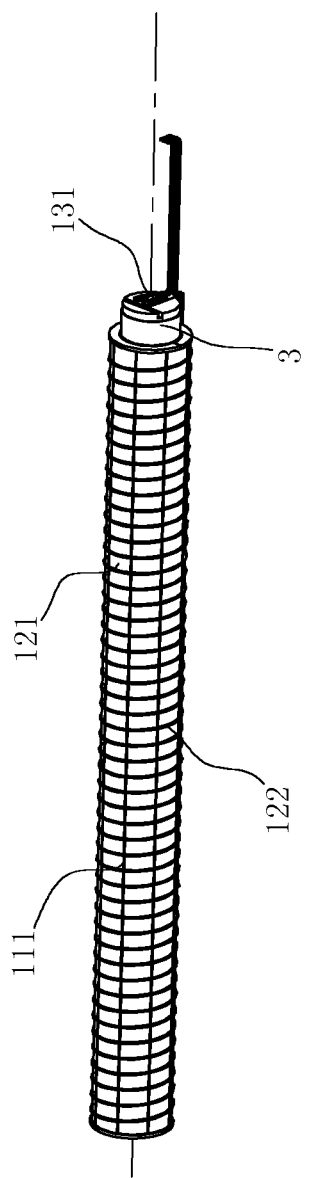

To enable a further understanding of the present invention content of the invention herein, refer to the detailed description of the invention and the accompanying drawings below:

Embodiment 1

FIG. 3 FIGS. 1, 2a, 2b, 3a, 3b, and 3c show a first embodiment of a probe for a trenchless guide instrument, comprising a battery region 1 and an electronic region 2 which are connected to each other.

The battery region 1 comprises a first hollow insulating pipe 11, an antenna 12 disposed outside the first insulating pipe 11, at least one battery 13 disposed inside the first insulating pipe 11. In this embodiment, the first insulating pipe 11 is formed by splicing two semi-cylindrical insulating pipes, and a plurality of insulating spacers 111, extending axially along an axis of the first insulating pipe 11, are distributed around a peripheral surface of the first insulating pipe 11, so that the peripheral surface of the first insulating pipe 11 is isolated into a plurality of insulating regions. In this embodiment, there are eight spacers 111, so that the peripheral surface of the first insulating pipe 11 is equally divided into eight regions. Alternatively, the amount of the spacers 111 can be increased or decreased according to the actual needs of the probe.

Figure 4:
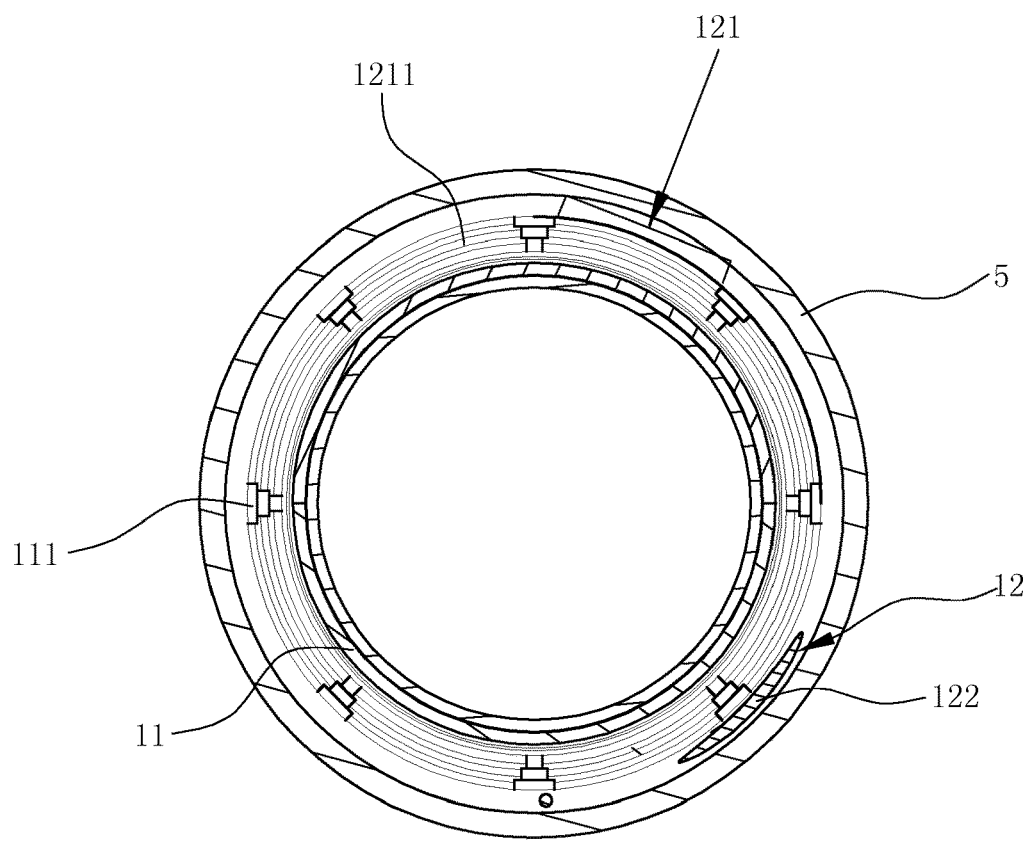
FIG. 4 is a radial sectional view of the probe according to the Embodiment 1 of the present invention.

The antenna 12 is disposed outside the first insulating pipe 11 and comprises a magnetic core 121 and a coil 122 winds around the magnetic cores 121. As shown in FIG. 4, the magnetic cores 121 are distributed in regions isolated by the first insulating pipe 11, and each magnetic core unit 1211 is formed by a plurality of strips of magnetic material, each magnetic core unit has an arc-shape cross section (here, the central angle of each arc-shape cross section is 45 degrees). The magnetic core units 1211 are insulated from each other, so that the magnetic core units 1211 in the eight regions form a hollow cylinder covered outside the first insulating pipe 11. The coil 122 winds around the hollow cylindrical magnetic cores 121. The probe having such an antenna 12 can transmit signals so as to transmit underground information to a receiving device on the ground. Preferably, each magnetic core unit 1211 is made from nickel steel which is somewhat rigid to meet the requirements of use.

The electronic region 2 comprises a metal pipe 21, and a second insulating pipe 22 disposed inside the metal pipe 21; a control circuit board 23 is disposed inside the second insulating pipe 22, and the metal pipe 21 is preferably made from stainless steel. The metal pipe (21; 21') and the first insulating pipe (11) each has a first end and a second end; the first end of the metal pipe 21 and the first end of the first insulating pipe 11 are connected through a connecting member 3. A power line 131 of the batteries 13, after passing through the connecting member 3 and then entering into the electronic region 2, can be connected to the control circuit board 23 for supplying power thereto. Tail end of the coil 122, after penetrating into the electronic region 2, is also connected to the control circuit board 23.

A first cover 41, configured to seal the second end of the first insulating pipe 11 for avoiding the at least one battery 13 from falling out of the first insulating pipe 11, and also to limit the position of the first insulating pipe 11, is disposed on the second end of the first insulating pipe 11. A second cover 42, configured to seal the second end of the metal pipe 21 for avoiding the second insulating pipe 22 and the control circuit board 23 from falling out of the metal pipe 21, is disposed on the second end of the metal pipe 21. Meanwhile, a copper sheet 43 is connected between the second cover 42 and the control circuit board 23, to transfer the temperature of the control circuit board 23 in time through the second cover 42 so that the temperature inside the second insulating pipe 22 can be detected from the outside of the probe, and an alarm may be given in time if abnormality occurs.

An outer pipe 5, which is preferably made from glass fiber, is disposed outside the antenna 12 and the metal pipe 21.

During the operation, a sensor on the control circuit board 23 detects state information and other information of the probe, encodes the information according to certain rules, and then modulates the useful information onto an electromagnetic wave which is transmitted to a receiver on the ground through the coil 122.

Figure 5:
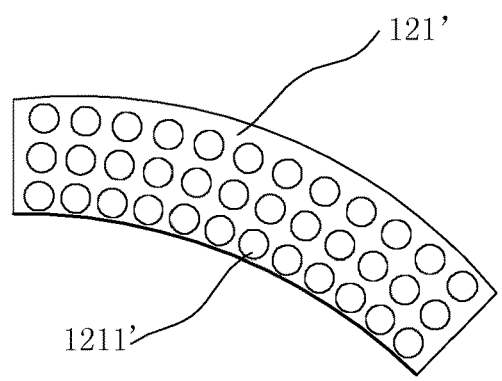
FIG. 5 is a sectional view of magnetic core units according to another embodiment of the present invention.

FIG. 5 shows another embodiment of magnetic cores 121'. In this embodiment, each magnetic core unit 1211' is formed by a plurality of strips of magnetic material, each magnetic core unit has an arc-shape cross section.

Embodiment 2

Figure 6A:
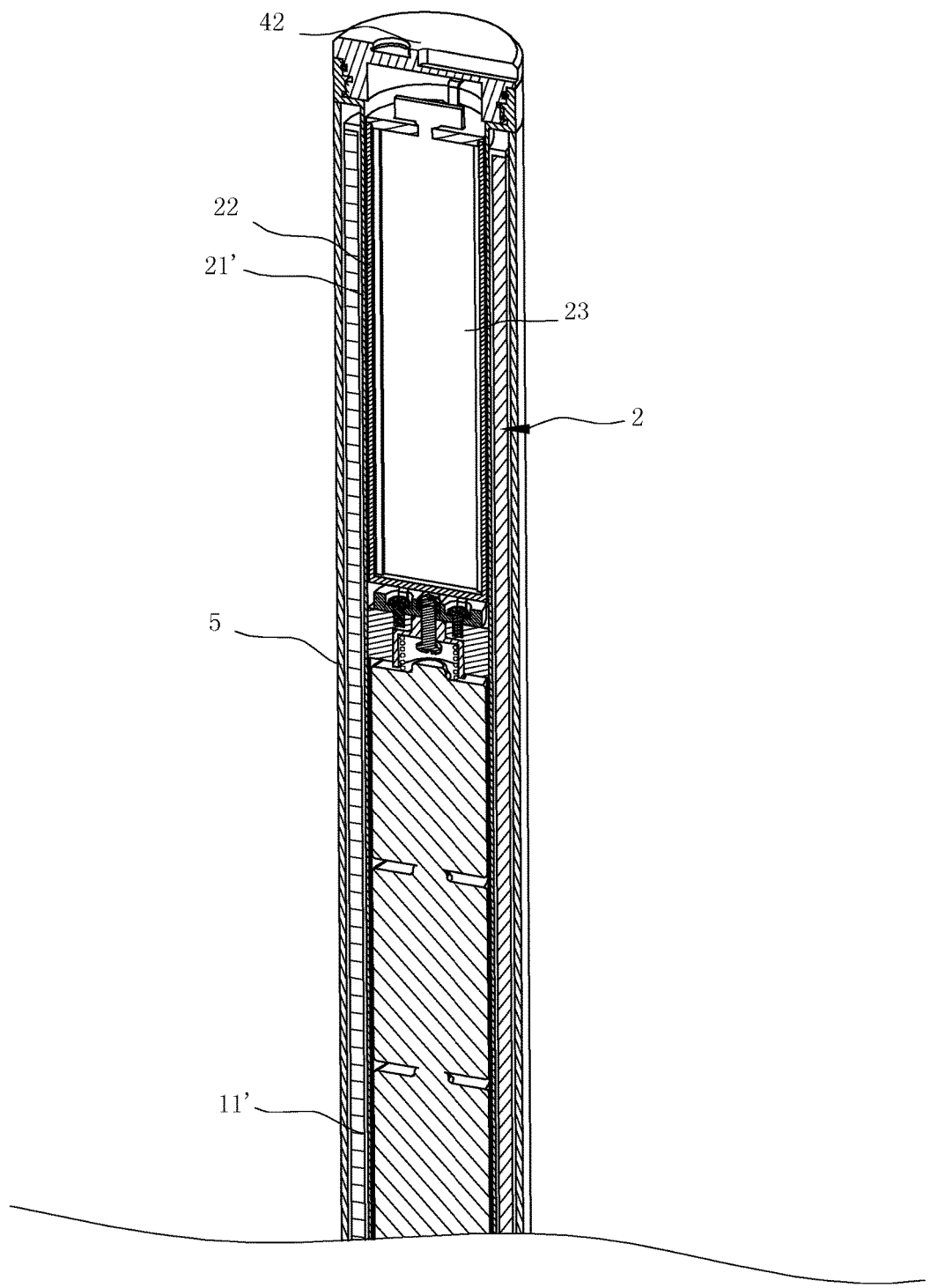
FIGS. 6a and 6b an axial sectional view of a probe according to the Embodiment 2 of the present invention.
Figure 6B:
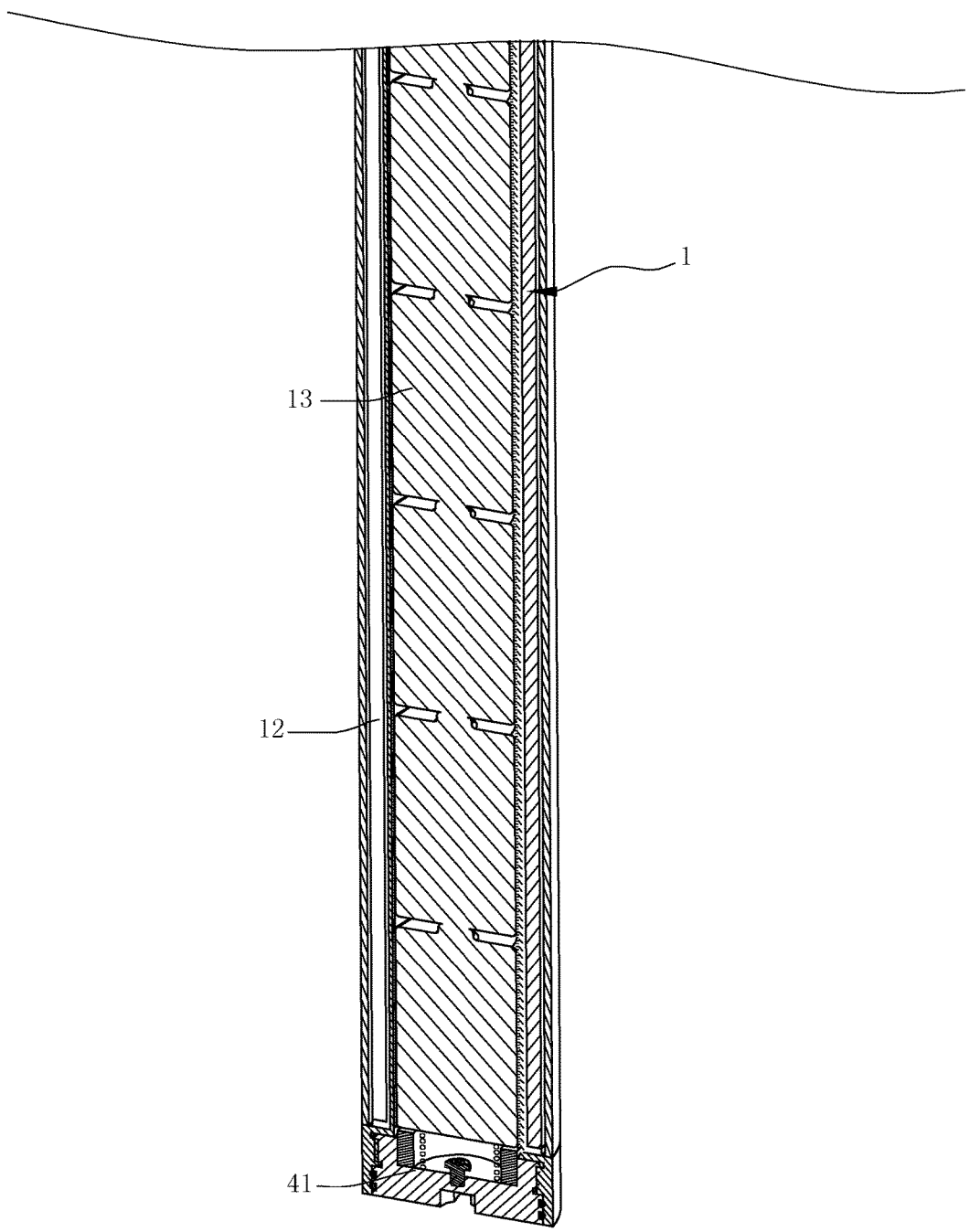
Figure 7:
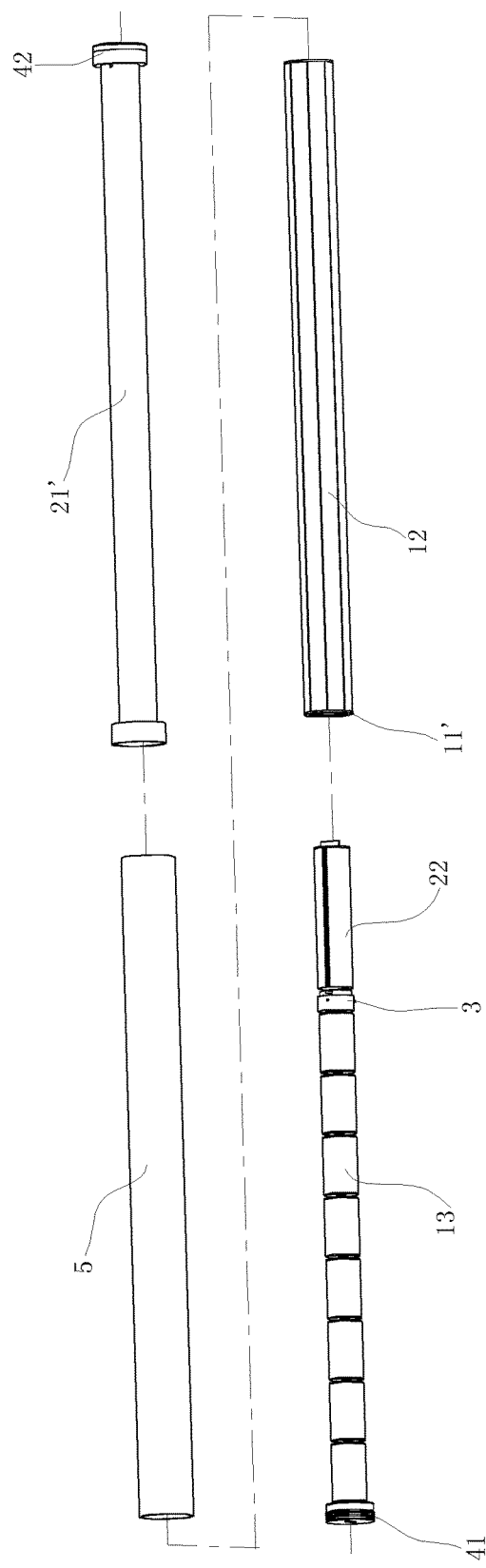
FIG. 7 is an exploded view of the probe according to the Embodiment 2 of the present invention.

As shown in FIGS. 6a and 6b, and FIG. 7, the difference between the Embodiment 2 and the Embodiment 1 lies in that: a first insulating pipe 11' extends into the electronic region 1 and the battery region 2, and covers the at least one battery 13 and the second insulating pipe 22, and a metal pipe 21' also extends into the electronic region 1 and the battery region 2, and is disposed between the first insulating pipe 11' and the at least one battery 13.

The second insulating pipe 22 and the at least one battery 13 are connected through a connecting member 3, the metal pipe 21' has a first end and a second end; a first cover 41 is disposed on the first end of the metal pipe 21', a second cover 42 is disposed on the second end of the metal pipe 21', and an outer pipe 5 is disposed outside the antenna 12 (not shown).

The invention claimed is:

1. A probe for a trenchless guide instrument comprising:
   a battery region and an electronic region adjacent to the battery region;
   an antenna;
   a control circuit board disposed inside the electronic region;
   at least one battery disposed inside the battery region;
   a first insulating pipe disposed inside the antenna and outside the at least one battery;
   a metal pipe connected to the first insulating pipe, and
   a second insulating pipe disposed inside the metal pipe, wherein,
   the at least one battery supplies power to the control circuit board;
   the first insulating pipe is disposed inside the battery region, and the antenna is disposed outside the first insulating pipe;
   the metal pipe and the second insulating pipe are disposed inside the electronic region,
   the control circuit board is disposed inside the second insulating pipe,
   the antenna further comprises a magnetic core, and a coil winds around the magnetic cores and one end of the coil is connected to the control circuit board;
   the magnetic core further comprises a plurality of magnetic core units, each magnetic core unit is made from magnetic material, the plurality of magnetic core units are positioned on a peripheral surface of the first insulating pipe, and are insulated from each other.

2. The probe of claim 1, wherein each magnetic core unit is made from nickel steel.

3. The probe of claim 1, wherein the metal pipe and the first insulating pipe each has a first end and a second end; the first end of the metal pipe and the first end of the first insulating pipe are connected through a connecting member;
   a first cover is disposed on the second end of the first insulating pipe, a second cover is disposed on the second end of the metal pipe; an outer pipe is disposed outside the antenna and the metal pipe.

4. The probe of claim 1, wherein the first insulating pipe extends into the electronic region, a metal pipe and a second insulating pipe disposed inside the metal pipe are both disposed inside the electronic region;
   the metal pipe extends into the battery region and is located between the at least one battery and the first insulating pipe; and the control circuit board is disposed inside the second insulating pipe.

5. The probe of claim 4, wherein the second insulating pipe and the at least one battery are connected through a connecting member;
   the metal pipe has a first end and a second end;
   a first cover is disposed on the first end of the metal pipe; and
   a second cover is disposed on the second end of the metal pipe; an outer pipe is disposed outside the antenna.

6. The probe of claim 1, wherein a plurality of insulating spacers, extending along an axis of the first insulating pipe, are distributed around a peripheral surface of the first insulating pipe, a space between every two insulating spacers defines a positioning region; and the plurality of magnetic core units are distributed in the positioning regions forming a ring.

7. The probe of claim 6, wherein each magnetic core unit is formed by a plurality of sheets of magnetic material, each magnetic core unit has an arc-shape cross section.

8. The probe of claim 6, wherein each magnetic core unit is formed by a plurality of strips of magnetic material, each magnetic core unit has an arc-shape cross section.

* * * * *